United States Patent
Mei et al.

(10) Patent No.: US 11,390,695 B2
(45) Date of Patent: Jul. 19, 2022

(54) PROCESS FOR GAS-PHASE POLYMERIZATION OF OLEFINS

(71) Applicant: BASELL POLIOLEFINE ITALIA S.R.L., Milan (IT)

(72) Inventors: Gabriele Mei, Channelview, TX (US); Antonio Mazzucco, Ferrara (IT); Tiziana Caputo, Ferrara (IT); Enrico Balestra, Ferrara (IT); Davide Tartari, Ferrara (IT); Paola Massari, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 83 days.

(21) Appl. No.: 16/498,303

(22) PCT Filed: Mar. 7, 2018

(86) PCT No.: PCT/EP2018/055537
§ 371 (c)(1),
(2) Date: Sep. 26, 2019

(87) PCT Pub. No.: WO2018/177701
PCT Pub. Date: Oct. 4, 2018

(65) Prior Publication Data
US 2020/0031957 A1 Jan. 30, 2020

(30) Foreign Application Priority Data
Mar. 27, 2017 (EP) .................................... 17162954

(51) Int. Cl.
| | | |
|---|---|---|
| C08F 2/34 | (2006.01) | |
| C08F 2/00 | (2006.01) | |
| C08F 4/02 | (2006.01) | |
| C08F 4/622 | (2006.01) | |
| C08F 10/06 | (2006.01) | |
| C08L 23/14 | (2006.01) | |

(52) U.S. Cl.
CPC ............. *C08F 2/34* (2013.01); *C08F 2/001* (2013.01); *C08F 4/022* (2013.01); *C08F 4/6228* (2013.01); *C08F 10/06* (2013.01); *C08L 23/142* (2013.01)

(58) Field of Classification Search
CPC .. C08F 2/34; C08F 2/001; C08F 4/022; C08F 4/6228; C08F 10/06; C08F 23/142
See application file for complete search history.

(56) References Cited

U.S. PATENT DOCUMENTS

| | | | | |
|---|---|---|---|---|
| 5,047,458 A | * | 9/1991 | Grossman | C07D 251/54 524/100 |
| 5,047,468 A | * | 9/1991 | Lee | C08F 297/08 525/53 |
| 2011/0184131 A1 | * | 7/2011 | Cai | B01J 8/1863 526/64 |

FOREIGN PATENT DOCUMENTS

| | | |
|---|---|---|
| CN | 101175775 A | 5/2008 |
| CN | 105308077 A | 2/2016 |
| CN | 105899553 A | 8/2016 |
| EP | 1012195 A1 | 6/2000 |
| EP | 2722347 A1 | 4/2014 |
| WO | 2006067052 A1 | 6/2006 |
| WO | 2009080660 A1 | 7/2009 |
| WO | 2012031986 A1 | 3/2012 |

OTHER PUBLICATIONS

International Search Report and Written Opinion dated Apr. 11, 2018 (Apr. 11, 2018) For Corresponding PCT/EP2018/055537.

* cited by examiner

*Primary Examiner* — Edward J Cain

(57) ABSTRACT

Process for the preparation of heterophasic propylene copolymer compositions (RAHECO) made from or containing a random propylene copolymer (RACO) and an elastomeric propylene copolymer (BIPO), the process being carried out in a reactor having two interconnected polymerization zones, a riser and a downcomer, wherein growing polymer particles:
(a) flow through the first polymerization zone, the riser, under fast fluidization conditions in the presence of propylene and of ethylene or an alpha-olefin having from 4 to 10 carbon atoms, thereby obtaining the random propylene copolymer (RACO);
(b) leave the riser and enter the second polymerization zone, the downcomer, through which the growing polymer particles flow downward in a densified form in the presence of propylene and of ethylene or an alpha-olefin having from 4 to 10 carbon atoms, wherein the concentration of ethylene or of the alpha-olefin in the downcomer is higher than in the riser, thereby obtaining the elastomeric propylene copolymer (BIPO); and
(c) leave the downcomer and are reintroduced into the riser, thereby establishing a circulation of polymer between the riser and the downcomer.

10 Claims, 1 Drawing Sheet

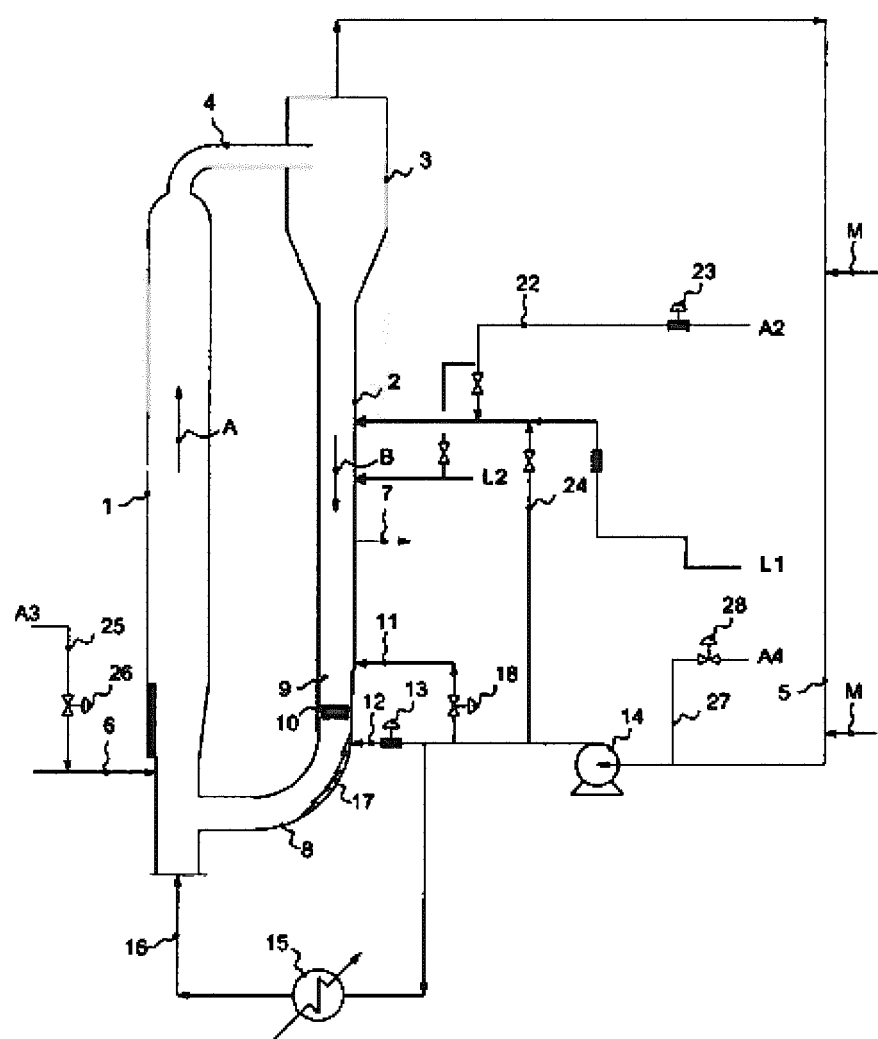

PROCESS FOR GAS-PHASE POLYMERIZATION OF OLEFINS

This application is the U.S. National Phase of PCT International Application PCT/EP2018/055537, filed Mar. 7, 2018, claiming benefit of priority to European Patent Application No. 17162954.6, filed Mar. 27, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a gas-phase process for the preparation of heterophasic propylene copolymer compositions.

BACKGROUND OF THE INVENTION

The development of Ziegler-Natta olefin polymerization catalysts has led to use on an industrial scale of processes in which the polymerization of olefins is carried out in a gaseous medium in the presence of a solid catalyst.

A technology for gas-phase polymerization processes is fluidized bed technology. In fluidized bed gas-phase processes, the polymer is confined in a vertical cylindrical zone, the polymer bed. In some instances, the reaction gases exiting the reactor are taken up by a compressor, cooled and sent back, together with make-up monomers and hydrogen, to the bottom of the polymer bed through a distribution plate. Entrainment of solid from the gas exiting the reactor is limited by dimensioning the upper part of the reactor termed "freeboard," where the gas velocity is reduced and, in some designs, by the interposition of cyclones in the gases exit line. The upper part of the reactor is the space between the upper bed surface and the gas exit point. The flow rate of the circulating gaseous monomers is set to assure a velocity within an adequate range above the minimum fluidization velocity and below the "transport velocity". In some instances, the heat of reaction is removed by cooling the circulating gas. The composition of the gas-phase controls the composition of the polymer while the addition of inert gases controls the reaction kinetics.

Fluidized bed reactors approximate the ideal behavior of a "continuous stirred-tank reactor" (CSTR); as such, it is difficult to obtain a homogeneous mixture of different types of polymeric chains. The composition of the gaseous mixture that is in contact with the growing polymer particle is uniform for the residence time of the particle in the reactor.

Multizone circulating reactor (MZCR) represents a gas-phase technology alternative to the fluidized bed reactor technology. This polymerization process is carried out in a gas-phase reactor having two interconnected polymerization zones. The polymer particles flow upwards through a first polymerization zone, denominated "riser", under fast fluidization or transport conditions, leave the riser and enter a second polymerization zone, denominated "downcomer", through which the polymer particles flow in a densified form under the action of gravity. A continuous circulation of polymer is established between the riser and the downcomer.

Two polymerization zones with different composition are obtained by feeding a gas/liquid stream, denominated "barrier stream", to the upper part of the downcomer. In some instances, the gas/liquid stream acts as a barrier to the gas phase coming from the riser and establishes a net gas flow upward in the upper portion of the downcomer. The established flow of gas upward has the effect of preventing the gas mixture present in the riser from entering the downcomer.

In a single reactor, the MZCR polymerization process can yield broad molecular weight olefin polymers, including multimodal olefin polymers. As used herein, the term "multimodal" refers to the modality of the molecular weight distribution and includes bimodal. The "modality" indicates how many different polymerization conditions were utilized to prepare the polyolefin, independently whether this modality of the molecular weight distribution can be recognized as separated maxima in a gel permeation chromatography (GPC) curve or not. In addition to the molecular weight distribution, the olefin polymer can have a comonomer distribution.

SUMMARY OF THE INVENTION

The present disclosure provides a process for the preparation of heterophasic propylene copolymer compositions (RAHECO) made from or containing a random propylene copolymer (RACO) and an elastomeric propylene copolymer (BIPO), the process being carried out in a reactor having two interconnected polymerization zones, a riser and a downcomer, wherein growing polymer particles:
  (a) flow through the first polymerization zone, the riser, under fast fluidization conditions in the presence of propylene and of ethylene or an alpha-olefin having from 4 to 10 carbon atoms, thereby obtaining the random propylene copolymer (RACO);
  (b) leave the riser and enter the second polymerization zone, the downcomer, through which the growing polymer particles flow downward in a densified form in the presence of propylene and of ethylene or an alpha-olefin having from 4 to 10 carbon atoms, wherein the concentration of ethylene or of the alpha-olefin in the downcomer is higher than in the riser, thereby obtaining the elastomeric propylene copolymer (BIPO); and
  (c) leave the downcomer and are reintroduced into the riser, thereby establishing a circulation of polymer between the riser and the downcomer.

BRIEF DESCRIPTION OF THE DRAWINGS

The FIGURE depicts schematically a gas-phase MZCR having two interconnected polymerization zones.

DETAILED DESCRIPTION OF THE INVENTION

In some embodiments and in the first polymerization zone (riser), fast fluidization conditions are established by feeding a gas mixture made from or containing one or more alpha-olefins at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In some embodiments and in the second polymerization zone (downcomer), the polymer particles flow under the action of gravity in a densified form, thereby achieving the high values of density of the solid (mass of polymer per volume of reactor) and approaching the bulk density of the polymer. As used herein, the term "densified form" of the polymer indicates that the ratio between the mass of polymer particles and the reactor volume is higher than 80% of the "poured bulk density" of the polymer. In some embodiments and in the downcomer, the polymer flows downward in a plug flow and small quantities of gas are entrained with the polymer particles.

In some embodiments, the two interconnected polymerization zones are operated such that the gas mixture coming from the riser is totally or partially prevented from entering the downcomer by introducing into the upper part of the downcomer a liquid or gas stream, denominated "barrier stream", having a composition different from the gaseous mixture present in the riser. In some embodiments, one or more feeding lines for the barrier stream are placed in the downcomer close to the upper limit of the volume occupied by the polymer particles flowing downward in a densified form.

In some embodiments, this liquid/gas mixture fed into the upper part of the downcomer partially replaces the gas mixture entrained with the polymer particles entering the downcomer. The partial evaporation of the liquid in the barrier stream generates in the upper part of the downcomer a flow of gas, which moves counter-currently to the flow of descending polymer, thereby acting as a barrier to the gas mixture coming from the riser and entrained among the polymer particles. In some embodiments, the liquid/gas barrier fed to the upper part of the downcomer is sprinkled over the surface of the polymer particles. In some embodiments, the evaporation of the liquid provides the upward flow of gas.

In some embodiments, the feed of the barrier stream causes a difference in the concentrations of monomers or hydrogen (molecular weight regulator) inside the riser and the downcomer, thereby producing a bimodal polymer.

In some embodiments, the gas-phase polymerization process involves a reaction mixture made from or containing the gaseous monomers, inert polymerization diluents and chain transfer agents to regulate the molecular weight of the polymeric chains. In some embodiments, hydrogen is used to regulate the molecular weight. In some embodiments, the polymerization diluents are selected from C2-C8 alkanes, alternatively propane, isobutane, isopentane and hexane. In some embodiments, propane is used as the polymerization diluent in the gas-phase polymerization.

In some embodiments, the barrier stream is made from or contains:
 i. from 10 to 100% by mol of propylene, based upon the total moles in the barrier stream;
 ii. from 0 to 80% by mol of ethylene, based upon the total moles in the barrier stream;
 iii. from 0 to 30% by mol of propane, based upon the total moles in the barrier stream; and
 iv. from 0 to 5% by mol of hydrogen, based upon the total moles in the barrier stream.

In some embodiments, the composition of the barrier stream is obtained from the condensation of a part of the fresh monomers and propane, wherein the condensed part is fed to the upper part of the downcomer in a liquid form. In some embodiments, the composition of the barrier stream is derived from condensation or distillation of part of a gaseous stream continuously recycled to the reactor having two interconnected polymerization zones.

In some embodiments, additional liquid or gas is fed along the downcomer at a point below the barrier stream.

In some embodiments, the recycle gas stream is withdrawn from a gas/solid separator placed downstream the riser, cooled by passage through an external heat exchanger and then recycled to the bottom of the riser. In some embodiments, the recycle gas stream is made from or contains the gaseous monomers, the inert polymerization components, and chain transfer agents. In some embodiments, the inert polymerization components include propane. In some embodiments, the chain transfer agents include hydrogen. In some embodiments, the composition of the barrier stream deriving from condensation or distillation of the gas recycle stream is adjusted by feeding liquid make-up monomers and propane before the gas recycle stream's introduction into the upper part of downcomer.

In some embodiments and in both riser and downcomer, the temperature is between 60° C. and 120° C. while the pressure ranges from 5 to 40 bar.

In an embodiment depicted in the FIGURE, the polymerization reactor includes a first polymerization zone 1 (riser), wherein the polymer particles flow upward under fast fluidization conditions along the direction of the arrow A and a second polymerization zone 2 (downcomer), wherein the polymer particles flow downward under the action of gravity along the direction of the arrow B.

The upper portion of the riser 1 is connected to a solid/gas separator 3 by the interconnection section 4. The separator 3 removes the major part of the unreacted monomers from the polymer particles and the polymer withdrawn from the bottom of separator 3 enters the top portion of the downcomer 2. The separated unreacted monomers, optionally together with polymerization diluents, such as propane, flow up to the top of separator 3 and are successively recycled to the bottom of the riser 1 via the recycle line 5.

A mixture made from or containing one or more olefin monomers, hydrogen as the molecular weight regulator and propane as the polymerization diluent, is fed to the polymerization reactor via one or more lines M, which are placed along the gas recycle line 5.

The catalyst components, optionally after a prepolymerization step, are continuously introduced into the riser 1 via line 6. In some embodiments, the produced polymer is discharged from the reactor via line 7, which is placed on the lower portion of the downcomer 2 and due to the packed flow of densified polymer, the quantity of gas entrained with the discharged polymer is minimized. In some embodiments and by inserting a control valve (not shown) on the polymer discharge line 7, the flow rate of polymer produced by the polymerization reactor is continuously control. In some embodiments, additional polymer discharge lines are placed in the bottom part of the downcomer (not shown).

The polymerization reactor further includes a transport section 8 connecting the bottom of downcomer 2 with the lower region of the riser 1. The bottom of the downcomer 2 converges into a restriction 9. In some embodiments, a control valve 10 with an adjustable opening is placed within the restriction 9. The flow rate Fp of polymer continuously circulated between the downcomer 2 and the riser 1 is adjusted by the level of opening of the control valve 10. In some embodiments, the control valve 10 is a mechanical valve. In some embodiments, the mechanical valve is selected from the group consisting of a butterfly valve and a ball valve. A stream of dosing gas is fed into the lower part of the downcomer 2 by line 11 placed at a short distance above the restriction 9. In some embodiments, the dosing gas to be introduced through line 10 is taken from the recycle line 5. In some embodiments, the flow Fp of polymer particles circulated between downcomer 2 and riser 1 is adjusted by varying the opening of the control valve 10 at the bottom of the downcomer or the flow rate of the dosing gas entering the downcomer via line 11. The flow rate of dosing gas is adjusted by a control valve 18, which is arranged on line 11.

The transport section 8 is designed as a bend descending from the bottom of downcomer 2 up to the lower region of the riser 1. Furthermore, a carrier gas is introduced via line 12 at the inlet of the transport section 8. The flow rate of carrier gas is adjusted by a control valve 13, which is arranged on line 12.

In some embodiments, the carrier gas is taken from the gas recycle line 5. In some embodiments, the gas recycle stream of line 5 is first subjected to compression by compressor 14 and a minor percentage of the recycle stream passes through line 12, thereby entering the transport section 8 and diluting the solid phase of polymer flowing through the transport section 8. The major part of the recycle stream, downstream the compressor 14, is subjected to cooling in a heat exchanger 15 and successively introduced via line 16 at the bottom of the riser 1 at a high velocity, thereby ensuring fast fluidization conditions in the polymer bed flowing along the riser 1.

The carrier gas merges with the densified polymer coming from downcomer 2 at the inlet portion of transport section 8, after exiting the slits of the gas distribution grid 17. The top end of the distribution grid 17 is coincident with the inlet of the transport section 8, and the distribution grid 17 extends along the bending of the transport section 8 for an angle $\alpha=60°$. The gas distribution grid 17 is formed by a plurality of trays fixed to the transport section 8 to form slits in the overlapping area of adjacent trays. The gas distribution grid 17 is as described in Patent Cooperation Treaty Publication No. WO 2012/031986.

Hydrogen and the comonomer(s) ethylene or C4-C10 alpha-olefin are pre-dispersed either in the liquid monomer L1 or L2 or alternatively in a fraction of recycle gas taken from recycle line 5 via line 24, and then fed to the reactor (flow rate A2, line 22 metered by one or more valves 23).

In some embodiments and as described in Patent Cooperation Treaty Publication No. WO 2011/029735, an antistatic composition is fed into the reactor at the bottom of the riser (flow rate A3, line 25 metered by valve 26) or into the main gas recycle line 5 (flow rate A4, line 27 metered by valve 28).

In some embodiments, the polymerization reactor is operated by adjusting the polymerization conditions and the concentration of monomers and hydrogen in the riser and in the downcomer, thereby tailoring the RAHECO. In some embodiments, the gas mixture entraining the polymer particles and coming from the riser is partially or totally prevented from entering the downcomer, thereby polymerizing two different monomers compositions in the riser and the downcomer. In some embodiments, a gaseous or liquid barrier stream is fed through a line placed in the upper portion of the downcomer. In some embodiments, the barrier stream has a composition different from the gas composition present inside the riser. In some embodiments, the flow rate of the barrier stream is adjusted such that an upward flow of gas counter-current to the flow of the polymer particles is generated. In some embodiments, the counter-current is at the top of the downcomer, thereby acting as a barrier to the gas mixture coming from the riser. In some embodiments, the barrier effect at the top of the downcomer occurs as described in European Patent Application No. EP 1012195 A1.

In some embodiments and by feeding hydrogen in the riser, the molecular weight of the RACO component is lowered, thereby yielding a RAHECO with high melt flow rate. In some embodiments and at the same time, feeding a barrier stream with little or no hydrogen yields a high molecular weight BIPO component in the downcomer.

In some embodiments, the reactor having two interconnected polymerization zones is placed upstream or downstream one or more other polymerization reactors based on liquid- or gas-phase technologies, thereby giving rise to a sequential multistage polymerization process. For instance, a fluidized bed reactor is used to prepare a first polymer component, which is successively fed to the gas-phase reactor of the FIGURE to prepare a second polymer component and a third polymer component.

In some embodiments, the process is carried out by using olefin polymerization catalysts, alternatively titanium-based Ziegler-Natta-catalysts, Phillips catalysts based on chromium oxide, or single-site catalysts. As used herein, single-site catalysts are catalysts based on chemically uniform transition metal coordination compounds, such as metallocene catalysts. In some embodiments, mixtures of two or more different catalysts are used. In some embodiments, the mixed catalyst systems are designated as hybrid catalysts.

In some embodiments, the process is carried out in the presence of Ziegler-Natta catalysts made from or containing:
i. a solid catalyst component made from or containing Mg, Ti, a halogen and an electron donor compound (internal donor),
ii. an alkylaluminum compound, and
iii. optionally, an electron-donor compound (external donor).

In some embodiments, component (i) is prepared by contacting a magnesium halide, a titanium compound having at least a Ti-halogen bond, and optionally an electron donor compound. In some embodiments, the magnesium halide is $MgCl_2$ in active form as a support for Ziegler-Natta catalysts. In some embodiments, the titanium compounds are $TiCl_4$, $TiCl_3$, or Ti-haloalcoholates of formula $Ti(OR)_{n-y}X_y$, where n is the valence of titanium, y is a number between 1 and n–1 X is halogen and R is a hydrocarbon radical having from 1 to 10 carbon atoms, can also be used.

In some embodiments, electron donor compounds for preparing Ziegler type catalysts are selected from the group consisting of alcohols, glycols, esters, ketones, amines, amides, nitriles, alkoxysilanes and aliphatic ethers. In some embodiments, these electron donor compounds are used alone or in mixtures with other electron donor compounds.

In some embodiments, other solid catalyst components used are based on a chromium oxide supported on a refractory oxide, such as silica, and activated by a heat treatment. Catalysts obtainable from those components consist of chromium (VI) trioxide chemically fixed on silica gel. These catalysts are produced under oxidizing conditions by heating the silica gels that have been doped with chromium(III) salts (precursor or precatalyst). During this heat treatment, the chromium(III) oxidizes to chromium(VI), the chromium (VI) is fixed and the silica gel hydroxyl group is eliminated as water.

In some embodiments, other solid catalyst components used are single-site catalysts supported on a carrier, such as metallocene catalysts, made from or containing:
i. at least a transition metal compound containing at least one n bond; and
ii. at least a cocatalyst selected from an alumoxane or a compound able to form an alkyl-metallocene cation.

In some embodiments, when the catalyst includes an alkylaluminum compound, such as in Ziegler-Natta catalysts, the molar ratio of solid catalyst component to alkylaluminum compound introduced into the polymerization reactor is in the range from 0.05 to 3, alternatively from 0.1 to 2, alternatively from 0.5 to 1.

In some embodiments, the catalysts are subjected to prepolymerization before being fed to the polymerization reactor. In some embodiments, the prepolymerization occurs in a loop reactor. In some embodiments, the prepolymerization of the catalyst system is carried out at a low temperature, alternatively in a range of from 0° C. to 60° C.

In some embodiments, additives, fillers and pigments are added. In some embodiments, the additional components are selected from the group consisting of nucleating agents, extension oils, mineral fillers, and other organic and inorganic pigments. In some embodiments, the inorganic fillers are selected from the group consisting of talc, calcium carbonate and mineral fillers and affect mechanical properties, such as flexural modulus and HDT. In some embodiments, talc has a nucleating effect.

In some embodiments, the nucleating agents are added in quantities ranging from 0.05 to 2% by weight, alternatively from 0.1 to 1% by weight, with respect to the total weight.

EXAMPLES

The following examples are given to illustrate the present invention without any limiting purpose.
Test Methods
Melt Flow Rate (MFR "L")
  Determined according to ISO 1133 (230° C., 2.16 Kg)
$^{13}$C NMR of Propylene/Ethylene Copolymers
$^{13}$C NMR spectra were acquired on a Bruker AV-600 spectrometer equipped with cryoprobe, operating at 160.91 MHz in the Fourier transform mode at 120° C.
The peak of the S$\beta\beta$ carbon was used as internal reference at 29.9 ppm. (The nomenclature was according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536.) The samples were dissolved in 1,1,2,2-tetrachloroethane-d2 at 120° C. with an 8% wt/v concentration. Each spectrum was acquired with a 90° pulse, 15 seconds of delay between pulses and CPD, to remove 1H-13C coupling 512 transients were stored in 32K data points using a spectral window of 9000 Hz.
The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

| | | |
|---|---|---|
| PPP = 100 T$\beta\beta$/S | PPE = 100 T$\beta\delta$/S | EPE = 100 T$\delta\delta$/S |
| PEP = 100 S$\beta\beta$/S | PEE = 100 S$\beta\delta$/S | EEE = 100 (0.25 S$\gamma\delta$ + 0.5 S$\delta\delta$)/S |
| S = T$\beta\beta$ + T$\beta\delta$ + T$\delta\delta$ + S$\beta\beta$ + S$\beta\delta$ + 0.25 S$\gamma\delta$ + 0.5 S$\delta\delta$ | | |

The molar percentage of ethylene content was evaluated using the following equation:

$$E\%mol = 100 * [PEP + PEE + EEE]$$

The weight percentage of ethylene content was evaluated using the following equation:

$$E\% \text{ wt.} = \frac{100 * E\% \text{ mol} * MWE}{E\% \text{ mol} * MWE + P\% \text{ mol} * MWP}$$

wherein P % mol is the molar percentage of propylene content while MWE and MWP are the molecular weights of ethylene and propylene, respectively.
The product of reactivity ratio r1r2 was calculated according to Carman (C. J. Carman, R. A. Harrington and C. E. Wilkes, Macromolecules, 1977; 10, 536) as:

$$r_1 r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP mmT$_{\beta\beta}$ (28.90-29.65 ppm) and the whole mmT$_{\beta\beta}$ (29.80-28.37 ppm)
Xylene-Soluble Fraction (XS)
  The Xylene-Soluble fraction (XS) was measured according to ISO 16152:2005, but with the following deviations:
    the volume of the polymer solution was 250 mL instead of 200 mL;
    the precipitation stage was carried out at 25° C. for 30 minutes, but for the final 10 minutes the polymer solution was kept under stirring by a magnetic stirrer instead of no stirring at all;
    the final drying step was done under vacuum at 70° C. instead of 100° C.
The XS is expressed as a weight percentage of the original 2.5 grams of polymer.
Intrinsic Viscosity of Xylene Soluble Fraction (XSIV)
  Determined in tetrahydronaphthalene at 135° C.
Flexural Modulus (MEF)
  Determined according to ISO 178.
Melting Temperature (Tm) and Crystallization Temperature (Tc)
  Melting temperature and crystallization temperature were determined by differential scanning calorimetry (DSC) according to the ASTM D 3417 method, which is equivalent to the ISO 11357/1 and 3 method.

Example 1

Preparation of the Ziegler-Natta Solid Catalyst Component

The Ziegler-Natta catalyst was prepared according to Example 5, lines 48-55, of the European Patent No. EP728769B1.

Preparation of the Catalyst System—Precontact

Before introducing the solid catalyst component into the polymerization reactors, the solid catalyst component was contacted with aluminum-triethyl (TEAL) and with the dicyclopentyldimethoxysilane (D donor) under the conditions reported in Table 1.
Prepolymerization
  The catalyst system was subjected to prepolymerization treatment at 20° C. by maintaining the catalyst system in suspension in liquid propylene for a residence time of 9 minutes before introducing the catalyst system into the polymerization reactor.
Polymerization
  The polymerization was carried out in gas-phase polymerization reactor including two interconnected polymerization zones, a riser and a downcomer, as described in European Patent No. EP782587. Hydrogen was used as molecular weight regulator. The polymer particles exiting from the polymerization step were subjected to a steam treatment to remove the unreacted monomers and dried under a nitrogen flow.

The main precontact, prepolymerization and polymerization conditions and the quantities of monomers and hydrogen fed to the polymerization reactor are reported in Table 1. Characterization data for the polymers are reported in Table 2.

Example 4C (Comparative)

Comparative Example 4C was prepared like Example 1, except that the polymerization was carried out according to the procedure described in Patent Cooperation Treaty Publication No. WO2011/144489, wherein the RACO is produced in the downcomer and the BIPO in the riser.

The main precontact, prepolymerization and polymerization conditions and the quantities of monomers and hydrogen fed to the polymerization reactor are reported in Table 1. Characterization data for the polymers are reported in Table 2.

TABLE 1

Process conditions

|  |  | Example | | | |
|---|---|---|---|---|---|
|  |  | 1 | 2 | 3 | 4C |
| PRECONTACT | | | | | |
| Temperature | ° C. | 15 | 15 | 15 | 15 |
| Residence Time | min | 13 | 13 | 15 | 13 |
| TEAL/catalyst | wt/wt | 6 | 6 | 6 | 5 |
| TEAL/Ext. Donor | g/g | 4 | 4 | 4 | 4 |
| PREPOLYMERIZATION | | | | | |
| Temperature | ° C. | 20 | 20 | 20 | 25 |
| Residence Time | min | 8 | 8 | 9 | 11 |
| POLYMERIZATION | | | | | |
| Temperature | bar-g | 63 | 63 | 65 | 65 |
| Pressure | bar-g | 23 | 23 | 27 | 22 |
| Residence Time | min | 100 | 116 | 135 | 121 |
| Mileage | kg/kg | 36000 | 33000 | 34000 | 11000 |
| Ratio between actual and nominal throughput | % wt | 120 | 100 | 100 | 50 |
| Run duration | Days | >7 | >7 | >7 | 0.5 |
| Split holdup riser | wt % | 38 | 38 | 38 | 20 |
| Split holdup downcomer | wt % | 62 | 62 | 62 | 80 |
| $C_2^-/C_2^- + C_3^-$ riser | mol/mol | 0.036 | 0.011 | 0.015 | 0.125 |
| $C_2^-/C_2^- + C_3^-$ downcomer | mol/mol | 0.064 | 0.038 | 0.017 | 0.009 |
| $H_2/C_3^-$ riser | mol/mol | 0.070 | 0.016 | 0.244 | 0.015 |
| $H_2/C_2^-$ downcomer | mol/mol | 0.176 | 0.003 | 2.2 | 0.210 |

Notes:
$C_2^-$ = ethylene;
$C_3^-$ = propylene;
$H_2$ = hydrogen;
Split = amount of polymer prepared in each reactor based on the total weight.

TABLE 2

Polymer characterization

|  |  | Example | | | |
|---|---|---|---|---|---|
|  |  | 1 | 2 | 3 | 4C |
| MFR (230° C./2.16 kg) | g/10' | 2.91 | 0.14 | 27.4 | 0.48 |
| Ethylene units | % wt | 9.2 | 8.3 | 3.9 | 9.6 |
| XS | % | 27.0 | 19.6 | 7.8 | 30 |
| XSIV | dl/g | 2.44 | 5.03 | 0.77 | 2.69 |
| Flex. Mod. | MPa | 360 | 670 | 1060 | 395 |
| Tm | ° C. | 134.9 | 146.3 | 146.3 | 142.2 |
| Tc | ° C. | 87.5 | 94.7 | 96.1 | 95.3 |

The invention claimed is:

1. A process for the preparation of heterophasic propylene copolymer compositions comprising a random propylene copolymer and an elastomeric propylene copolymer, the process being carried out in a reactor having two interconnected polymerization zones, a riser and a downcomer, wherein growing polymer particles:
    a) flow through the first polymerization zone, the riser, under fast fluidization conditions in the presence of propylene and of ethylene or an alpha-olefin having from 4 to 10 carbon atoms, thereby obtaining the random propylene copolymer;
    b) leave the riser and enter the second polymerization zone, the downcomer, through which the growing polymer particles flow downward in a densified form in the presence of propylene and of ethylene or an alpha-olefin having from 4 to 10 carbon atoms, wherein the concentration of ethylene or of the alpha-olefin in the downcomer is higher than in the riser, thereby obtaining the elastomeric propylene copolymer; and
    c) leave the downcomer and are reintroduced into the riser, thereby establishing a circulation of polymer between the riser and the downcomer.

2. The process according to claim 1, wherein the two interconnected polymerization zones are operated such that the gas mixture coming from the riser is totally or partially prevented from entering the downcomer by introducing into the upper part of the downcomer a liquid or gas stream, denominated "barrier stream", having a composition different from the gaseous mixture present in the riser.

3. The process according to claim 2, wherein one or more feeding lines for the barrier stream are placed in the downcomer close to the upper limit of the volume occupied by the polymer particles flowing downward in a densified form.

4. The process according to claim 2, wherein the barrier steam comprises propane.

5. The process according to claim 4, wherein the barrier steam comprises:
    i. from 10 to 100% by mol of propylene, based upon the total moles in the barrier stream;
    ii. from 0 to 80% by mol of ethylene, based upon the total moles in the barrier stream;
    iii. from 0 to 30% by mol of propane, based upon the total moles in the barrier stream; and
    iv. from 0 to 5% by mol of hydrogen, based upon the total moles in the barrier stream.

6. The process according to claim 5, wherein the composition of the barrier stream derives from condensation or distillation of part of a gaseous stream continuously recycled via a gas recycle line to the reactor having two interconnected polymerization zones.

7. The process according to claim 1, wherein an antistatic composition is fed into the reactor at the bottom of the riser or into the gas recycle line.

8. The process according to claim 1, wherein the reactor having two interconnected polymerization zones is placed upstream or downstream one or more other polymerization reactors based on liquid- or gas-phase technologies, thereby giving rise to a sequential multistage polymerization process.

9. The process according to claim 1, which is carried out in the presence of a Ziegler-Natta catalyst comprising:
  i. a solid catalyst component comprising Mg, Ti, a halogen and an electron donor compound denominated "internal donor",
  ii. an alkylaluminum compound, and
  iii. optionally, an electron-donor compound denominated "external donor".

10. The process according to claim 9, wherein the molar ratio of solid catalyst component to alkylaluminum compound introduced into the polymerization reactor is in the range from 0.05 to 3.

* * * * *

UNITED STATES PATENT AND TRADEMARK OFFICE
CERTIFICATE OF CORRECTION

PATENT NO. : 11,390,695 B2
APPLICATION NO. : 16/498303
DATED : July 19, 2022
INVENTOR(S) : Mei et al.

It is certified that error appears in the above-identified patent and that said Letters Patent is hereby corrected as shown below:

In the Specification

In Column 6, Line 59, delete "n" and insert --π--, therefor

Signed and Sealed this
Thirtieth Day of January, 2024

Katherine Kelly Vidal
*Director of the United States Patent and Trademark Office*